March 14, 1967 W. E. INGHAM ET AL 3,309,668

APPARATUS FOR RECOGNIZING POORLY SEPARATED CHARACTERS

Filed Dec. 26, 1962 4 Sheets-Sheet 1

March 14, 1967 W. E. INGHAM ET AL 3,309,668

APPARATUS FOR RECOGNIZING POORLY SEPARATED CHARACTERS

Filed Dec. 26, 1962 4 Sheets-Sheet 3

United States Patent Office 3,309,668
Patented Mar. 14, 1967

3,309,668

APPARATUS FOR RECOGNIZING POORLY SEPARATED CHARACTERS

William Ellis Ingham, London, Christopher Archibald Gordon Lemay, Isleworth, Middlesex, and John James Jarrett, Higher Denham, England, assignors to Electric & Musical Industries Limited, Hayes, England, a company of Great Britain Filed Dec. 26, 1962, Ser. No. 247,157
Claims priority, application Great Britain, Jan. 4, 1962, 365/62
4 Claims. (Cl. 340—146.3)

The present invention relates to pattern recognition devices, and has particular, but not exclusive, application to printed character recognition devices.

In printed character recognition devices it is necessary that the character is recognised with a considerable degree of accuracy even when mutilated characters are presented. If the characters are not recognised with this high degree of accuracy, then the value of such a device is reduced. Most particularly, the wrong recognition by the device is liable to be embarrassing to subsequent activities, and one difficulty in ensuring correct recognition follows from the fact that the positions at which patterns may be encountered, say on sensing a printed record, is liable to indeterminacy. The recognition process usually depends on knowning that signals derived from a sensing device relate to one pattern, but the construction of automatic means to provide this knowledge in the machine is difficult.

It is one object of the present invention to provide a pattern recognition device in which the possibility of incorrect recognition of a pattern is substantially reduced.

In accordance with the present invention there is provided a pattern recognition device comprising means for sensing an area in which patterns may occur in indeterminate positions, to derive signals in response to such patterns which signals may occur at indeterminate times depending on the positions of said patterns, means for applying said signals to correlation devices to drive from said devices a plurality of correlation signals representative respectively of the correlation between a pattern being sensed and a plurality of predetermined patterns, said correlation signals being liable to exhibit extreme values at indeterminate times dependent upon the sensing process and the positions of the patterns which are sensed, storage means for storing an indication of the correlation signal which has attained the extreme value of greatest magnitude since said storage means was last reset, means for utilising the indication of said storage means to identify the pattern sensed by said sensing means if the respective correlation signal is not exceeded in magnitude within a predetermined time interval beginning with the storage of said indication, and means for thereupon resetting said storage means.

Figure 1:
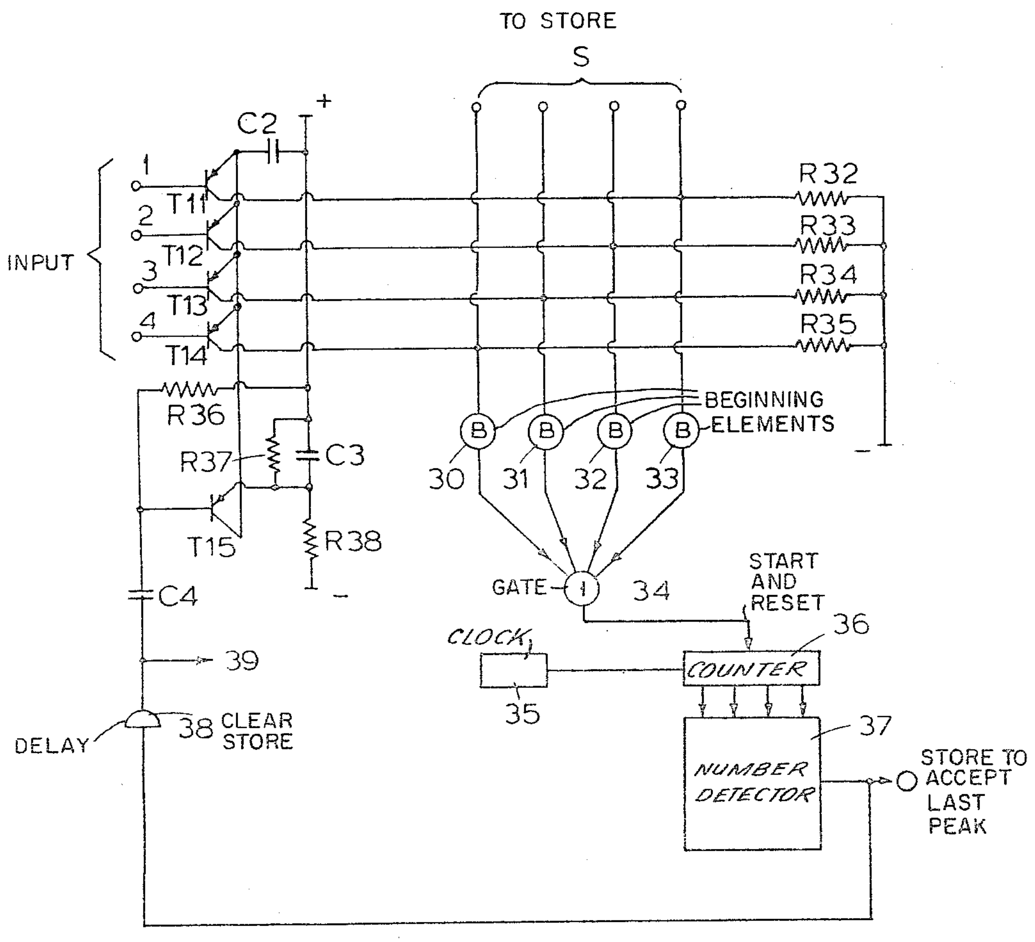
Figure 2A:
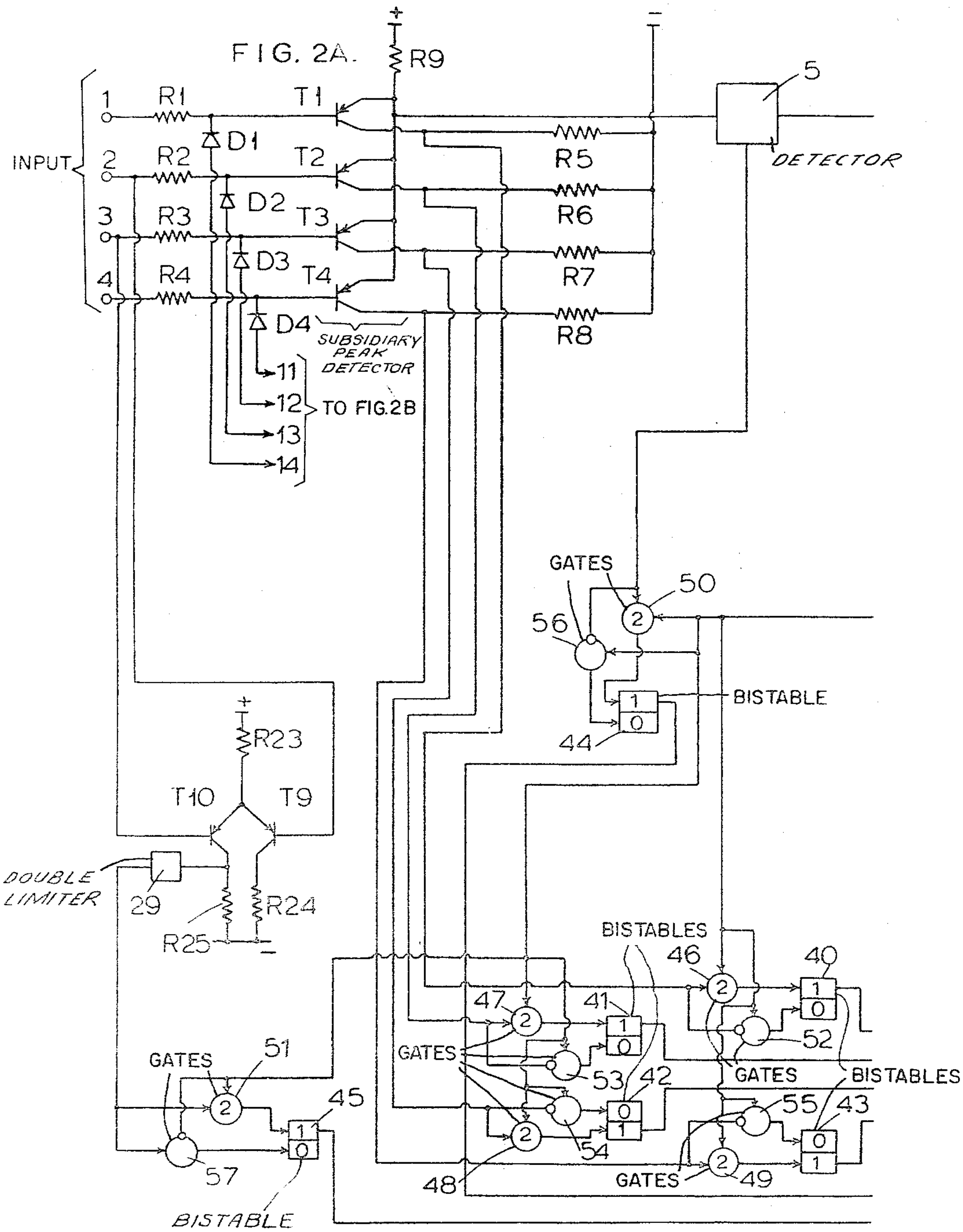
Figure 2B:
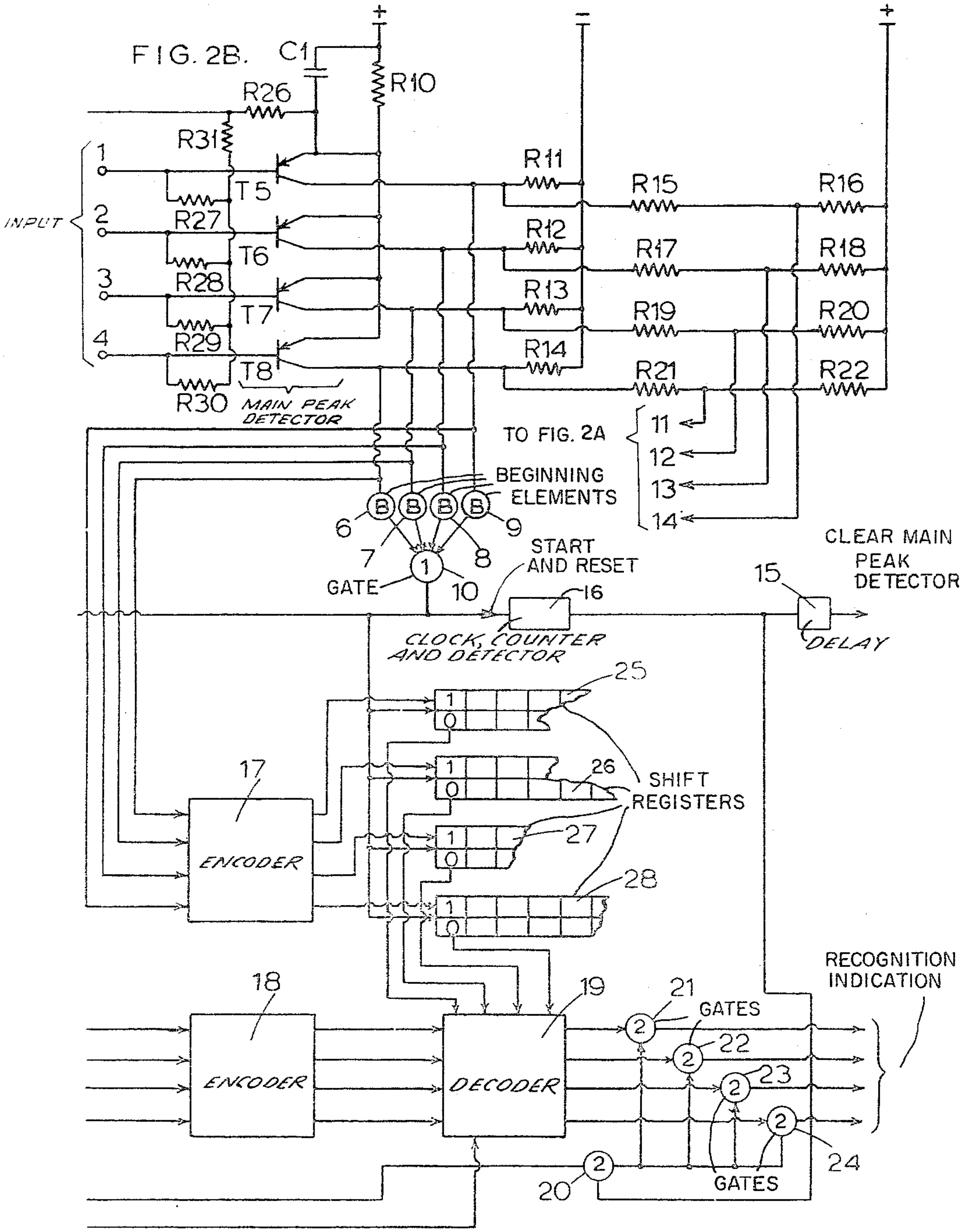
Figure 3:
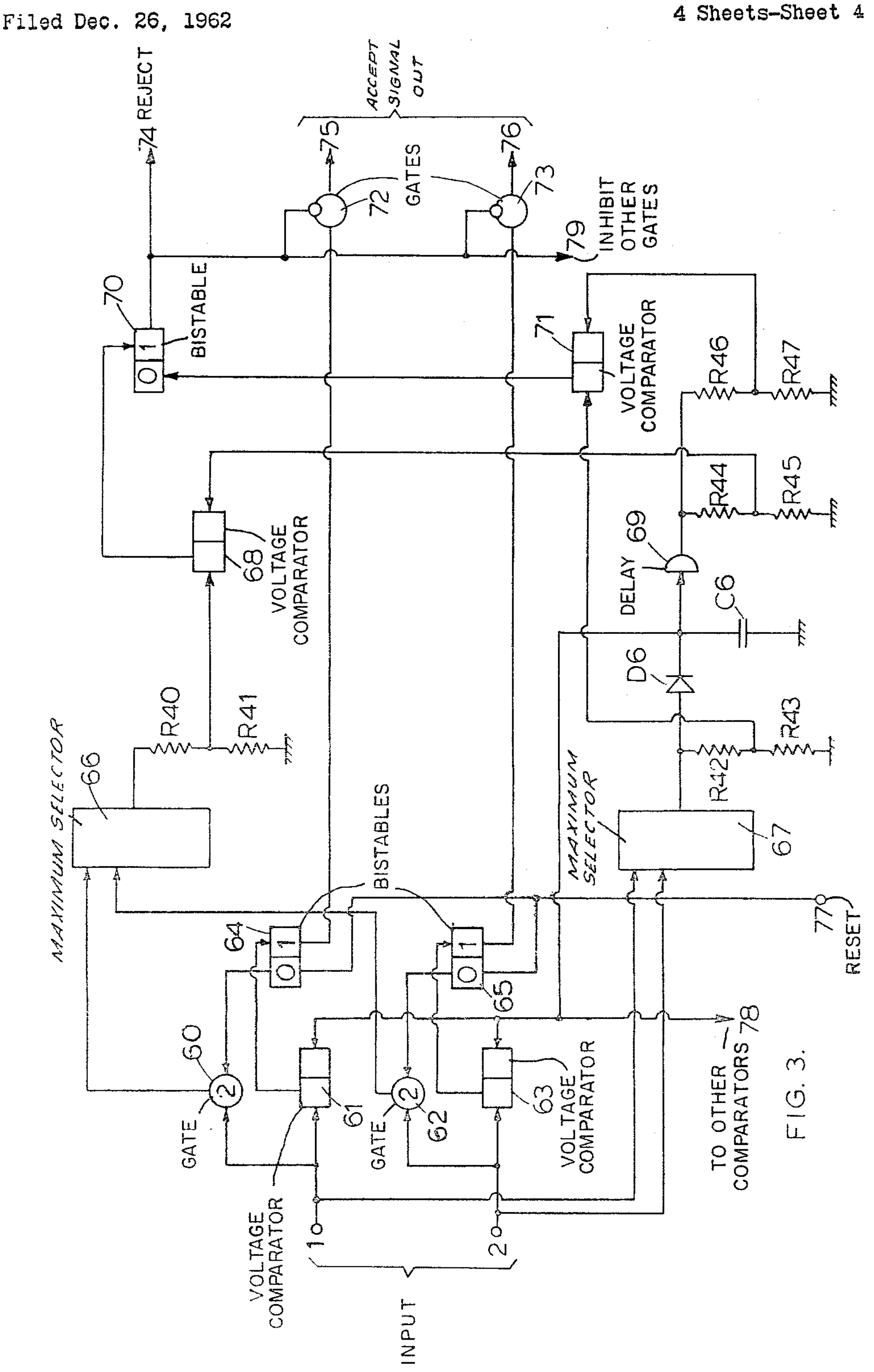

In order that the present invention may be clearly understood and more readily carried into effect, it will now be described with reference to the accompanying drawings, of which:

FIGURE 1 shows the general arrangement of a recognition device according to one example of the invention, in which recognition depends on a signal of extreme value remaining unexceeded for a predetermined time interval, FIGURES 2A and 2B show a development of the device shown in FIGURE 1 in which subsidiary extremes are also taken into account in the recognition process, and FIGURE 3 shows a circuit arrangement for relating the amplitude of the highest extreme with that of the next highest extreme occurring in the same time interval.

FIGURE 1 illustrates parts of a pattern recognition device according to one embodiment of the present invention whereby the source of that one of a plurality of waveforms which reaches the highest peak value during sensing of a pattern even although the time when the sensing device encounters the pattern may be indeterminate can be ascertained. The source of the high peak is indicative of the pattern presented for recognition. It will be assumed in the present case that the device is used to recognise printed characters, and reference numerals 1 to 4 show, for convenience, only four inputs which may be connected to output terminals of correlation devices to which the signals derived by the sensing device are applied. When a character is presented for recognition, waveforms appear at each input terminal 1 to 4 which, as the character is sensed, vary according as factors of correlation between the presented character and a plurality of predetermined standard characters or character features to which the correlation device correspond. Each waveform at the terminals 1 to 4 may vary therefore from zero value up to a predetermined limit, and at any one instant any one waveform may have the maximum value, but will never exceed said limit. Several suitable correlation devices are described in U.S. Patent No. 3,252,140 dated May 17, 1966, in the names of C. A. G. LeMay and W. E. Ingham, and entitled Pattern Recognition Devices, although any other suitable arrangement may be used.

The terminals 1 to 4 are connected to the bases of transistors T11 to T14 respectively with the result that the transistor receiving the highest peak initially will conduct, charging capacitor C2 and producing a pulse in one of the beginning elements 30 to 33 and on one of the terminals S which are connected to a store. Clearly, until a subsequent peak exceeding this initial peak is received, the voltage charge on capacitor C2 which is applied to the emitters of T11 to T14 will inhibit conduction of the transistors. However, when a further peak of greater amplitude occurs at one of the terminals 1 to 4, the process is repeated, this time the voltage charge remaining on C2 being higher. During the time elapsed after the reception of the first pulse from one of the beginning elements 30 to 33 through the gate 34, a clock 35 which is started by the reception of the first pulse operates to move a counter 36 from one end towards the other. On every subsequent pulse passing through gate 34, the counter 36 is reset to zero, and only when the clock is able to move the counter to the position indicated by the particular number detector 37 is the element 37 energised to produce a pulse on the line marked O and to the delay element 38. The line O is applied to a store which, for simplicity, is not illustrated as it has no part in the basic invention and may be of conventional form, permitting the acceptance of the information received, relating to the terminal from which the last received peak was applied. The time taken for the counter 36 to reach the predetermined position required by the detector 37 is set to suit the standard dimensions of the patterns to be identified and/or the scanning rate and the precise organisation of the correlation means. By way of example, suitable time would be about half the time taken to scan a single character.

The invention is based on the experience of the inventors that the highest peak indicating the closest match between one arrangement of stored character features and the unknown character will occur at approximately the middle of the time period taken to scan the character. Thus if the peak level stored in the capacitor C2 remains undisturbed for a given time interval it can safely be assumed that a character has been encountered and sensed, without the location of the character in relation to the sensing aperture being determined. The clock is arranged to be started by the first pulse received which is above an arranged threshold level and the main purpose of arranging that such a level is set is to avoid commencing a cycle of recognition on the final peaks of a character which has already been recognised. After the signal to accept the character has been passed from the detector 37 to the store, the delay element 38 produces an output pulse after a short delay which is applied by conductor 39 to clear the store for received information, and also is applied to the base of transistor T15 which conducts, thus discharging capacitor C2 in readiness for the next cycle of operation.

In many circumstances, however, it is not merely sufficient to identify a character from a maximum amplitude peak, and more positive recognition can be achieved by relating the amplitude of the main peak to other subsidiary peaks. It could, for example, be stipulated that if the second highest peak exceeds say 90% of the highest peak, the character be rejected. Any appropriate measure of signal amplitude could be used, for example, peak to peak or peak to mean. FIGURE 2 of the drawings shows an example of an arrangement wherein the relationship of peaks is taken into account.

Reference numerals 1 to 4 indicate terminals to which inputs may be applied as described hereinbefore with reference to FIGURE 1. These terminals are connected to two sets of peak sensing devices similar to that previously described, the device utilising transistors T5 to T8 being the main peak detector, and the device comprising transistors T1 to T4 being the subsidiary peak detector. The main peak detector operates in a similar manner to the device described hereinbefore but provision is also made to develop a voltage across the pairs of resistors R15 and R16 and R22, which form potential dividers, when the particular transistor T5 to T8 is conducting. This voltage is fed to the appropriate diode D1 to D4 by means of the applicable conductor 11 to 14. Presuming that a maximum peak occurred at the input 1, then T5 would conduct and trigger the beginning element 9. Also, the input 1 would pass through the attenuator R1, but at the same time the voltage applied to diode D1 through conductor 14, would operate to prevent conduction of T1.

However, if at the same time, the next highest peak occurred on input 4, then T8 would not conduct and therefore the transistor T4 would not be inhibited by diode D4 and would conduct.

A consideration of the subsequent operation of the device presumes that this state of affairs exists. That is, that a main peak is applied to input 1, and the next highest peak to input 4. The output from T5 is applied to the beginning element 9 and also the encoder 17 which produces a binary output code of one bit per register in the shift register 25 to 28 indicating which input was a maximum. As this device may be of known construction it is indicated for convenience by a block. At substantially the same time T4 produces an output to the encoder 18, which may be of similar construction to the encoder 17. The encoder 17 supplies shift registers 25 to 28 which store the coded information. Outputs from the shift register supply the decoder 19, and the signal from the beginning element 9 passes through gate 10 to the shift register which are then stepped one place to the right. The decoder 19 may take the form of a diode matrix, or an interlaced arrangement of toroids as disclosed in said aforementioned Patent No. 3,252,140. The coded information from the encoder 18 and the shift registers 25 to 28 is all supplied to the decoder in which an output code is associated with each arrangement of input codes. To reduce the complexity of the drawing, only part of the shift registers 25 to 28 are shown, and only some of the connections to the decoder are shown. The signal which has passed through the gate 10 is also applied to a clock, a counter, and a particular number detector such as the arrangement comprising blocks 35, 36 and 37 in FIGURE 1, shown here as a single block 16. An output from the detector indicates that a maximum peak has occurred at a predetermined time before, and that the character may be recognised tentatively. An output is then fed to the two gate 20. If another input is present at this gate, then an output is supplied to the "two" gates 21 to 24 permitting the passing of any information which is appplied to the other respective inputs of gates 21 to 24. The second input to gate 20 is developed from a detector 5, the function of which is to supply an output only if the main peak detector produces an output which is a predetermined amount greater than the output of the subsidiary peak detector. The operation of the device 5 is as follows: A mean level of input signals is obtained by connecting inputs 1 to 4 to a summing resistance R31 through the individual resistances R27 to R30. The output level of the highest peak is obtained from the junction of C1 and the emitter of T5 and applied through R26 to detector 5 together with the mean level voltage from resistor R31. In this way, the peak level signal from C1 has its datum level related to the mean level of all inputs at a particular time. To the other side of detector 5 is applied the voltage corresponding to the next highest subsidiary peak, and a voltage comparison takes place in known manner. If the peak voltage exceeds the subsidiary peak voltage by a sufficient amount, then an output is supplied to the gate 20. If, however, it does not, then no output is supplied and the character will not be recognised because none of gates 21 to 24 will be enabled.

An output from the clock, counter and detector 16 is applied to a delay element 15, similar to element 38 in FIGURE 1, and is used to clear the main peak detector. A suitable method of achieving this is by means of an arrangement shown, using transistor T15 and its associated components, in FIGURE 1.

A final protection against the incorrect recognition of a character is also incorporated in FIGURE 2, taking the form of transistors T9 and T10 connected as a long-tailed pair. In the illustrated case, inputs 2 and 3 are shown connected respectively to the bases of transistors T9 and T10 in order that two sets of signals which may be particularly relevant can be specifically compared. Block 29 shows a double limiting circuit which may be of any suitable form well known in the art. The purpose of the comparison of two outputs, which do not necessarily refer to the unknown character to be recognised, rests in the fact that when one particular character is scanned the output derived from transducers set to recognise another pattern can be particularly informative. These other ouputs may be from correlation devices relating to other whole patterns or to subsets or features of patterns. A hypothetical example, in which whole patterns are considered, will serve to make the principle clear. Support that the character "6" is to be recognised. If the output from a set of transducers arranged to recognize this character is related to the outputs of sets of transducers which are arranged to recognise and "8" and a "3" the relative levels of the signals from the "8" sets and the "3" sets from the first part of the characters will show directly if the leading curve of the "6" is broken or not, and moreover will give an indication of the length of any such break. Such a comparison could well be of great value in the determination of whether a character is a mutilated "6," or perhaps a mutilated "5" and the output from this comparison circuit is taken as another input to the decoder 19, and it may be noted in passing that the form of this circuit is suitable for use as the detector 5 hereinbefore described, although other arrangements will be apparent to one skilled in the art. In order that the information as to the identity of a subsidiary peak concerns such a peak which occurs at substantially the same time as the maximum peak, and also to ensure that the comparison signal from the device 5 also relates to the relative heights of the main and subsidiary peaks at that time, and further to ensure that information as to other characters, which may be of use in identification of certain unknown characters, all this information is fed through similar devices, comprising a "two" gate, an "inhibit" gate, and a two-state element. Such an arrangement for example is shown in the lead from transistor T1 in the subsidiary peak detector to the encoder 18. The signal from gate 10 which is used to shift the registers 25 to 28, is also applied to a "two" gate 46 and an "inhibit" gate 52. If T1 is producing an output then the gate 46 sets the two-state element 40 into its "1" state, the gate 52 being inhibited. If, however, one of the other transistors T2 to T4 is producing an output, then the inhibit signal is not present on gate 52, and consequently the signal from gate 10 sets the element 40 into its "0" state. It is clear from the foregoing that this ensures that only the information available at the time of the occurrence of the maximum peak will be used in the final identification of the character, with the exception of the information relating to previous maximum peaks which will be stored in the shift registers 25 to 28. This last information will take the form of the ascent of maximum peaks in order of magnitude with the highest peak in the first stage of the register, and is of obvious value in the determination of identity of the character.

A further refinement such as was described with reference to the embodiment illustrated in FIGURE 1 will give additional protection. Thus, if it is known that no character will produce a relevant output peak below certain level, then a limiting arrangement can be incorporated either in the input device itself, or alternatively in the peak annd subsidiary peak detector circuits in known manner.

An arrangement which may be used in addition to or alternatively for some or all of the various protection measures described in the above embodiments is illustrated in FIGURE 3 of the accompanying drawings, whereby if two maximum peaks in a recognition cycle occur on different channels and fall within a predetermined percentage value of one another, the recognition is rejected on the grounds of poor discrimination. Referring to the circuit, two inputs indicated by reference numerals 1 and 2 are shown. The inputs are obtained from correlation networks or other devices representing predetermined patterns or pattern features. Once again, it must be understood that there must be as many inputs as there are predetermined patterns or pattern features. Associated with each of the input terminals is an individual group of circuit elements comprising in the case of input terminal 1 a voltage comparator 61, a "2" gate 60, a bistable device 64 and an inhibit gate 72, and comprising in the case of the input terminal 2 the elements 62, 63, 55 and 73. The rest of the circuit elements shown are common to all inputs. Considering the operation of the device an input applied to terminal 1 is connected to one input of the comparator 61 which may, for example, comprise a pair of emitter coupled transistors or cathode coupled valves, the signals to be compared being respectively connected to the bases of the transistors or grids in the case of valves. To the other input of the comparator 61 is applied as a reference voltage the maximum voltage so far recorded on any of the inputs. This maximum voltage is derived by taking all the inputs to a device 67 which produces an output from the maximum input. The device 67 may comprise transistors arranged like T1 to T4 of FIGURE 2. The output from 67 is passed through a diode D6 which operates to peak rectify the output signal, the resulting voltage being stored on the capacitor C6 and applied on conductor 78 to comparators 61 and 63 and other similar comparators connected to the other inputs. Because of the delay involved in passing the highest input signal through the device 67 and the diode D6 if the highest signal to date appears on the input terminal 1 then it will exceed the voltage applied to the other input of the comparator 61 causing the comparator 61 to switch and consequently to trigger the bistable 64 to produce an output to the inhibit gate 72 and to remove the enabling signal to the "2" gate 60. The "2" gate 60 is normally enabled to pass signals from terminal 1 to the device 66 which is identical in construction to the device 67. The outputs of both these devices are reduced by 50% by the respective potential dividers R40 and R41 and R42 and R43. 50% of the output of the device 66 is applied to the junction of this potential divider to a voltage comparator 68 which may be identical in construction to the comparators 61 and 63. 50% of the output from the device 67 is derived from the junction of R42 and R43 and similarly applied to one input of a voltage comparator 71 which, once again, may be identical in construction to comparators 61 and 63. Clearly, in order to produce a signal from the devices 66 and 67 which is 50% of the output of those devices R40 and R41 must be equal and similarly R42 and R43 must be equal. To the other input of the comparator 68 is applied a reference voltage deriver from the junction of resistors R44 and R45. The relative values of the resistors R44 annd R45 govern the percentage of the stored value on C6 which after a short delay 69 is applied to the input of the comparator 68. For the purposes of description it will be assumed that the resistors R44 and R45 bear the respective relationship 55% to 45% so that 45% of the stored value is applied to the input of comparator 68. A similar arrangement of resistors R46 and R47 produces a reference level to comparator 71. This will, however, be a different value from that applied to comparator 68 and for preference in the present embodiment will be considered to be 55% of the value stored on C6. This will be effected by arranging that R46 and R47 bear the relationship 45% to 55% respectively. When the input signal to comparator 68 exceeds the reference signal an output is produced which switches the bistable 70 to its "1" state producing a signal on the conductor 74 signifying that the pattern is to be rejected, and inhibiting the gates 72 and 73 through conductor 79 and other corresponding inhibit gates not shown to prevent any signal to accept a particular pattern from being released. Alternatively, when the input to comparator 71 exceeds the reference value an output is derived which switches the bistable 70 to its "0" state thus removing the rejection signal on conductor 74 and the inhibition signal on conductor 79.

The operation of the device will now be considered in greater detail. Consider a signal on input 1 which increases slowly to a maximum which considerably exceeds the previous largest value so that it can be considered at various amplitudes. While it is less than 90% of the previous largest signal which it will be assumed occurred on input 2, it will not switch the comparator 61 nor the comparator 68 because although the "2" gate 60 would be enabled the signal would not exceed the level from the junction of R44 and R45. If the signal on 1 continues to rise, then as it exceeds 90% of the previous maximum signal on 2, the signal from the junction of R40 and R41 would exceed the reference signal from the junction of R44 and R45 causinng 68 to switch over and trigger the bistable 70 to produce a rejection signal on the conductors 74 and 79. The input on 1 continues to rise until the time arrives when it exceeds momentarily the stored value on C6 and switches the comparator 61 to turn the bistable 64 into its "1" state. This removes the enabling signal from the "2" gate 60. As the voltage now continues to rise to above 110% of the previous maximum the comparator 71 will receive a signal from the junction of resistors R42 and R43 which will exceed, due to the effect of the delay 69, the voltage derived from the junction of resistors R46 and R47. Hence the comparator 71 will be switched over and will switch the bistable element 70 into its "0" state thus removing the inhibition from the gate 73 and the rejection signal from the conductor 74 allowing the output from bistable 65 to be passed out on conductor 76 in the form of a signal to accept the input at 1 as correct.

If the previous largest signal had occurred on 1 and the subsequent largest signal also occurs on 1 clearly there are no grounds for rejecting the correctness of the input on 1. The means by which this desired result is accomplished are as follows. The gate 60 will have been disabled by the previous largest signal so that only the comparator 71 will have the incoming signal applied to it. While the subsequent signal remains less than 90% of the previous signal nothing will happen. When the present signal exceeds the previous signal the comparator 61 will switch over again but will have no effect because the bistable 64 is already switched to its "1" state. If the subsequent signal still continues to rise on 1 and exceeds 110% of the previous signal then the comparator 71 will operate to produce an output to the bistable 70. However, 70 will already be in its "0" state so the effect of comparator 71 will cancel a non-existent rejection signal. Meanwhile, the level stored on C6 will rise to the new higher level. The references in the foregoing to 90% and 110% values of signals follow from the suggested dimensioning of the resistors R44 and R45 and R46 and R47. Clearly, other percentage levels may be chosen by altering the dimensions of these resistors. Finally, it should be noted that the bistables 64 and 65 and other similar bistables applying to other inputs must be designed so that only one can be in its "1" state at any time to avoid outputs on more than one conductor such as 75 and 76. This may be achieved readily by providing the bistables with a common supply which produces only sufficient current to operate a signal one. Moreover, these bistables must be so arranged that the last signal from a comparator such as 61 and 63 automatically sets its associated bistable to the "1" state and returns any other bistable which was in the "1" state to a "0" state. At the end of a recognition cycle all the bistables will be reset by a signal applied to terminal 77. At the same time, the store C6 must be discharged. The means for achieving this are not shown but preferably should operate to retain a small residual voltage in C6 which acts as a threshold to prevent the device being triggered by noise signals before the commencement of a subsequent character.

All the foregoing embodiments may be included in a single pattern recognition device but it must be noted that they may all be used individually or in any preferred combination depending upon the degree of protection required in any particular arrangement.

What we claim is:

1. A pattern recognition device comprising means for sensing an area in which patterns may occur in indeterminate positions, to derive signals in response to such patterns which signals may occur at indeterminate times depending on the positions of said patterns, means for applying said signals to correlation devices to derive from said devices a plurality of correlation signals representative respectively of the correlation between a pattern being sensed and a plurality of predetermined patterns, said correlation signals being liable to exhibit extreme values at indeterminate times responsive to said sensing means and the positions of the patterns which are sensed, storage means for storing an indication of the correlation signal which has attained the extreme value of greatest magnitude since said storage means was last reset, timing means of which the operation is initiated by the attainment of an extreme value of greatest magnitude, identifying means for utilising the indication of said storage means to identify the pattern sensed by said sensing means, said identifying means being enabled by said timing means at the end of a predetermined time delay from the initiation of said timing means, means for thereupon resetting said storage means and resetting means for resetting said timing means to recommence at zero time if an extreme value of greater magnitude than that stored occurs before the terminaton of said predetermined time delay.

2. A pattern recognition device in accordance with claim 1, comprising means for storing the correlation signal which has attained the extreme value of greatest magnitude since the first storage means was last reset, means for comparing the stored correlation with other correlation signals and means for inhibiting identification if said compared signals do not differ by more than a predetermined amount.

3. A pattern recognition device in accordance with claim 1, comprising further storage means for storing indication of at least one correlation signal which attains extreme values less than said greatest magnitude since said first storage means was last reset, said identifying means being responsive also to said further indication.

4. A pattern recognition device in accordance with claim 1, wherein said identifying means includes means for detecting predetermined relationship between specific correlation signals.

References Cited by the Examiner

UNITED STATES PATENTS

| | | | |
|---|---|---|---|
| 2,924,812 | 2/1960 | Merritt | 340—146.3 |
| 2,933,246 | 4/1960 | Rabinow | 340—146.3 |
| 3,111,645 | 11/1963 | Milford | 340—146.3 |
| 3,246,296 | 4/1966 | Heizer et al. | 340—146.3 |

MAYNARD R. WILBUR, *Primary Examiner.*

MALCOLM A. MORRISON, J. E. SMITH, J. SCHNEIDER, *Assistant Examiners.*